No. 857,358. PATENTED JUNE 18, 1907.
E. A. MULLER.
TOOL HOLDING DEVICE.
APPLICATION FILED JULY 3, 1905.
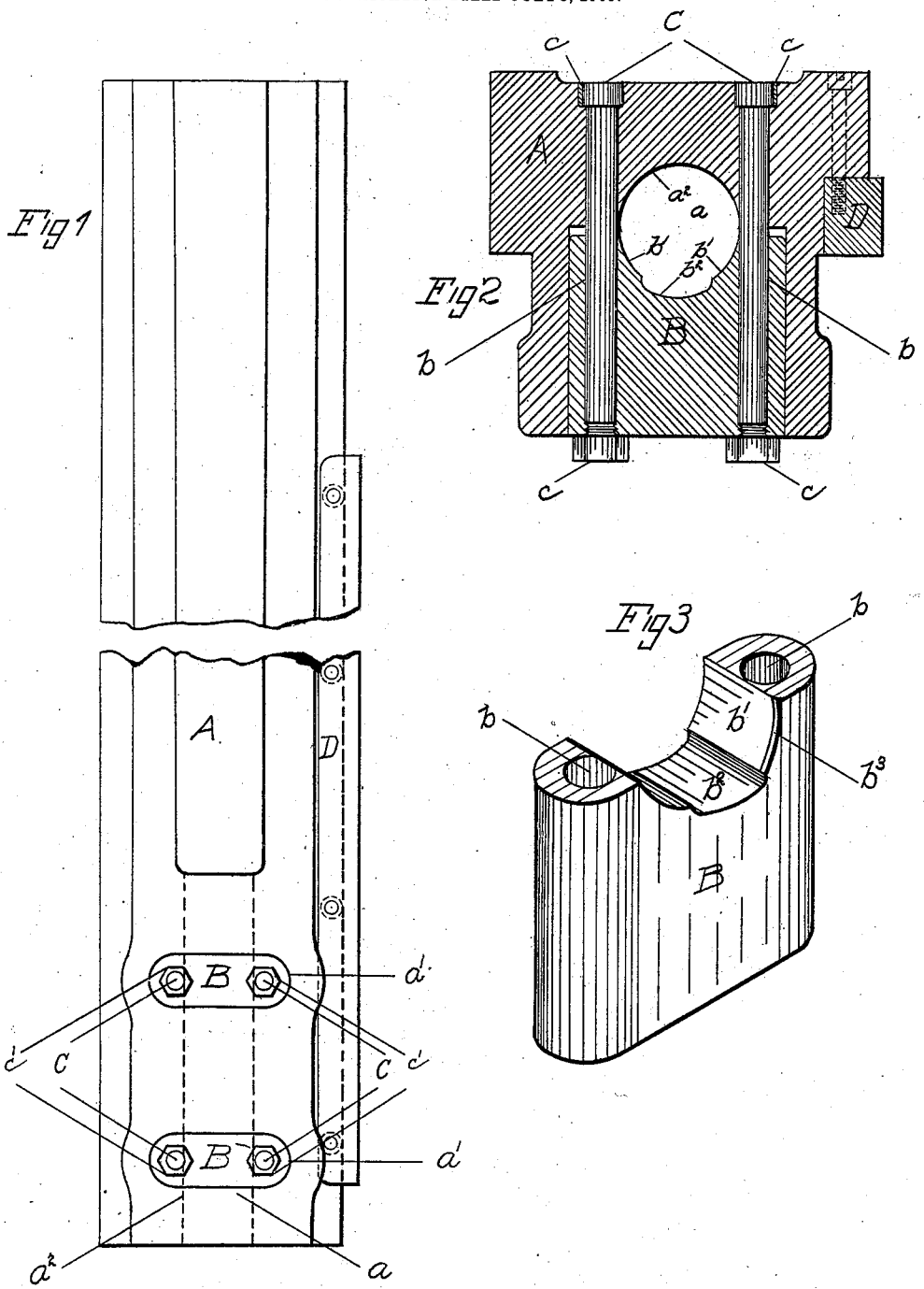

UNITED STATES PATENT OFFICE.

EDWARD A. MULLER, OF MADISONVILLE, OHIO, ASSIGNOR TO THE KING MACHINE TOOL COMPANY, OF WINTON PLACE, OHIO, A CORPORATION OF OHIO.

TOOL-HOLDING DEVICE.

No. 857,358.      Specification of Letters Patent.      Patented June 18, 1907.

Application filed July 3, 1905. Serial No. 268,185.

*To all whom it may concern:*

Be it known that I, EDWARD A. MULLER, a citizen of the United States, residing at Madisonville, in the county of Hamilton and State of Ohio, have invented new and useful Improvements in Tool-Holding Devices, of which the following is a specification.

My invention relates to tool holding devices, particularly as applied to boring mills and other machines where boring and cutting rams are used. Ram is the term usually applied to the sliding part which carries the tool holder in boring mills. To this ram the tool holder is clamped and from it, the tool holder projects. This ram or sliding part is provided with a rack and is actuated by a gear, or carries a nut or thread, and is actuated by a screw. Heretofore, in machine tools of this character, where a ram is used, it was customary to hold the tool holder with a key or by bushing or by wedging; all of these are more or less unsatisfactory for the reason that they are liable to deface the tool holder and prevent the withdrawal of same unless extraordinary force is used. Where the ram is cleft and the natural resilience of the metal overcome by clamping the tool holder, a strain is already upon the ram before any cutting is done, hence the resistance it offers against breaking strain is commensurately reduced. My improved ram holds the tool bar securely, prevents defacement and allows it to be removed easily without force.

In the particular embodiment of my invention selected for illustration, my improvement is shown applied to boring mill ram, in which:—

Figure 1, is a front elevation of boring and cutting ram. Fig. 2, is a sectional end view of ram through clamp. Fig. 3, is an isometric view of one of the clamp blocks.

Referring to the drawings, A, represents a boring ram, bored at one end to form a tool holder socket, $a$, having walls, $a^2$, and provided with one or more recesses, $a^1$, adapted to receive clamping blocks, B. Bar, A, is provided with a rack, D, which meshes with a feed pinion (not shown) to actuate the ram.

These clamping blocks are provided with bolts, C, adapted to draw said blocks tightly against the inner faces of recesses, $a^1$, or any interposed object. Preferably the bolts, C, pass through suitable holes, $b$, in the blocks, B, and are held against turning in any convenient manner, as by keys, $c$. Blocks, B, have their inner faces hollowed at the same arc as the tool holder they are adapted to secure in position. These blocks may have one or more recesses, $b^2$, on faces, $b^1$, to secure an additional wedging effect in clamping. The lower edge of the blocks, B, may be chamfered as indicated in Fig. 3, by $b^3$, to permit the tool holder being easily inserted.

The operation is as follows: The nuts, $c^1$, are loosened allowing the clamping blocks, B, to be pushed outward. A suitably shaped tool holder, (in this case cylindrical), is then placed in the hole, $a$, and the nuts, $c^1$, $c^1$, tightened down compressing the tool holder tightly between the walls, $a^2$, of the ram, and $b^1$, of the clamping block, thus securely holding the tool holder in position.

The metal of the ram is usually cast iron, that of the block hardened steel and of the tool holder softer steel. These differences together with the size of the arc of the face, $b^1$, of the block, B, prevents the edge of the depression $b^2$, defacing the tool holder.

I claim as my invention and desire to secure by Letters Patent of the United States:—

A machine tool having in combination a ram bored longitudinally in alinement with the main spindle, said ram having recesses cutting its bore at right angles to the axis of said bore, clamping blocks fitted into said recesses, said blocks having inner faces formed to wedge a cylindrical tool shank placed in said bore, and bolts piercing said blocks and the ram on either side of the bore.

In testimony whereof I have hereunto set my hand in presence of two subscribing witnesses.

EDWARD A. MULLER.

Witnesses:
    JOSEPH R. GARDNER,
    CARROLL H. RICHARDS.